United States Patent
Zhang et al.

(10) Patent No.: US 7,440,292 B2
(45) Date of Patent: Oct. 21, 2008

(54) LATCH MECHANISM AND ELECTRONIC DEVICE WITH THE SAME

(75) Inventors: Yue-Hai Zhang, Shenzhen (CN); Chien-Li Tsai, Taipei Hsien (TW); Chun-Chi Liang, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 66 days.

(21) Appl. No.: 11/562,986

(22) Filed: Nov. 23, 2006

(65) Prior Publication Data

US 2007/0123103 A1    May 31, 2007

(30) Foreign Application Priority Data

Nov. 26, 2005    (CN)    ......................... 2005 2 0119389

(51) Int. Cl.
*H05K 7/14* (2006.01)
*H05K 7/18* (2006.01)

(52) U.S. Cl. ...................... 361/801; 361/732

(58) Field of Classification Search .......... 361/801, 361/802, 759, 740, 732, 726, 747, 754
See application file for complete search history.

(56) References Cited

U.S. PATENT DOCUMENTS

| | | | |
|---|---|---|---|
| 5,465,191 A | 11/1995 | Nomura et al. | |
| 5,576,929 A | 11/1996 | Uchiyama et al. | |
| 6,762,928 B2 | 7/2004 | Lo | |
| 7,088,588 B2 * | 8/2006 | Lee | 361/725 |
| 7,184,261 B2 * | 2/2007 | Chung | 361/683 |
| 2006/0146489 A1 * | 7/2006 | Huang et al. | 361/683 |
| 2007/0171605 A1 * | 7/2007 | Zhang et al. | 361/683 |

* cited by examiner

*Primary Examiner*—Hung S Bui
(74) *Attorney, Agent, or Firm*—Wei Te Chung (57) ABSTRACT

A latch mechanism for an electronic device is secured to a base of the electronic device. The latch mechanism includes a latch lever including a pressing portion for being applied an external force along a first direction and at least one latch portion for clasping a cover of the electronic device, at least one fulcrum plate for being secured to the base, at least one lifting plate deflectably secured to the fulcrum plate, at least one first elastic member positioned between the latch lever and the fulcrum plate to provide a first restoration force along the first direction to the latch lever, and at least one second elastic member positioned between the fulcrum plate and the lifting plate to provide a second restoration force to a side of the lifting plate so as to make the other side of the lifting plate resist against the cover.

19 Claims, 8 Drawing Sheets

LATCH MECHANISM AND ELECTRONIC DEVICE WITH THE SAME

BACKGROUND OF THE INVENTION

1. Field of the Invention

The present invention generally relates to latch mechanisms and, more particularly, to a latch mechanism automatically lifting a cover of an electronic device when being released and the electronic device utilizing the latch mechanism.

2. Description of Related Art

A notebook computer generally has a latch mechanism for latching and releasing a cover of a main frame, because it is necessary to prevent the closed cover from coming loose or opening accidentally. A conventional latch mechanism provides latching hooks to a cover so as to engage the cover with a main frame. In order to open the cover, an operation for releasing the latching hooks from the main frame and an operation for lifting the cover itself are executed consecutively with the latching hooks held in a releasing position. If latch mechanisms are provided to both the right and left sides of the cover, the operations for releasing the right latch mechanism by the right hand and for releasing the left latch mechanism by the left hand must be done simultaneously and then held in a released state while lifting the cover with both hands. Therefore, the conventional latch mechanism is inconvenient to open, and impossible to to do with a single hand.

Accordingly, a need exists for a latch mechanism resolving the above problem in the industry.

SUMMARY OF THE INVENTION

According to one aspect, a latch mechanism for an electronic device, which includes a cover and a base, is secured to the base of the electronic device. The latch mechanism includes a latch lever including a pressing portion for an external force being applied thereto along a first direction and at least one latch portion for clasping the cover, at least one fulcrum plate for being secured to the base corresponding to the at least one latch portion of the latch lever, at least one lifting plate deflectably secured to the at least one fulcrum plate, at least one first elastic member positioned between the latch lever and the at least one fulcrum plate to provide a first restoration force along a first direction to the latch lever, and at least one second elastic member positioned between the at least one fulcrum plate and the at least one lifting plate to provide a second restoration force to a side of the at least one lifting plate so as to make the other side of the at least one lifting plate resist against the cover.

According to another aspect, an electronic device includes a base, a cover pivotably attached to a top of the base, and a latch mechanism secured to the base for clasping the cover to the base and releasing the cover from the base. The base defines a first guiding hole in a front thereof and a pair of grooves at the top thereof. The cover extends a pair of latching hooks toward the base. The latching hooks are extendable through the grooves. The latch mechanism includes a latch lever including a pressing portion and a pair of latch portions, a pair of fulcrum plates secured to the base corresponding to the grooves in the base and the latch portions of the latch lever, a pair of lifting plates engaged with the fulcrum plates, a pair of first elastic members positioned between the latch lever and the fulcrum plates to provide restoration forces along a first direction to the latch lever, and a pair of second elastic members positioned between the fulcrum plates and the lifting plates to proved second restoration forces along a third direction to the lifting plates to make the lifting plates resist against the latching hooks. The pressing portion is received in the first guiding hole of the base for an external force being applied thereto to push the latch lever along the first direction. The latching portions are claspable by the latching hooks to clasp the cover to the bases. The lifting plates are deflectable around a second direction perpendicular to the first direction.

Other systems, methods, features, and advantages of the present latch mechanism and the present electronic device will be or become apparent to one with skill in the art upon examination of the following drawings and detailed description. It is intended that all such additional systems, methods, features, and advantages be included within this description, be within the scope of the present apparatus, and be protected by the accompanying claims.

BRIEF DESCRIPTION OF THE DRAWINGS

Many aspects of the present latch mechanism and the present electronic device can be better understood with reference to the following drawings. The components in the drawings are not necessarily drawn to scale, emphasis instead being placed upon clearly illustrating the principles of the present device. Moreover, in the drawings, like reference numerals designate corresponding parts throughout the several views.

DETAILED DESCRIPTION OF THE INVENTION

Reference will now be made to the drawings to describe the preferred embodiments of the present latch mechanism and the present electronic device, in detail.

Figure 1:
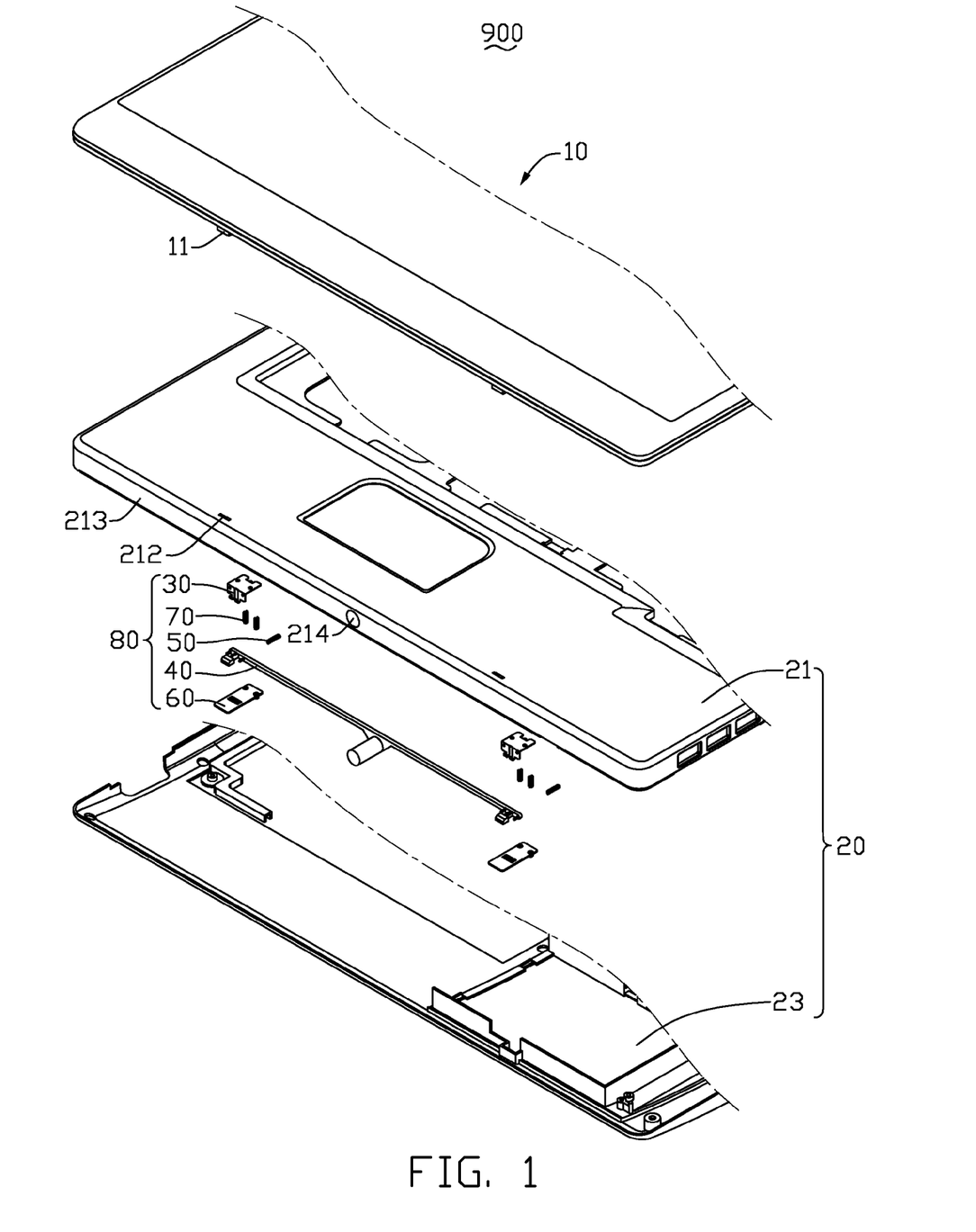
FIG. 1 is an exploded, isometric view of a part of an electronic device in accordance with an exemplary embodiment, the electronic device including a cover, a base, and a latch mechanism.

Referring to FIG. 1, an electronic device 900 in accordance with an exemplary embodiment is illustrated. The electronic device 900 includes a cover 10, a base 20, and a latch mechanism 80. The cover 10 and the base 20 are pivotably attached together by a hinge mechanism (not shown) at back edges thereof, and rotatable with respect to each other around an axis of rotation. The latch mechanism 80 is mounted to a vicinity of a front edge of the base 20 to clasp the cover 10 to the base 20 or release the cover 10 from the base 20, according to different circumstances.

Figure 2:
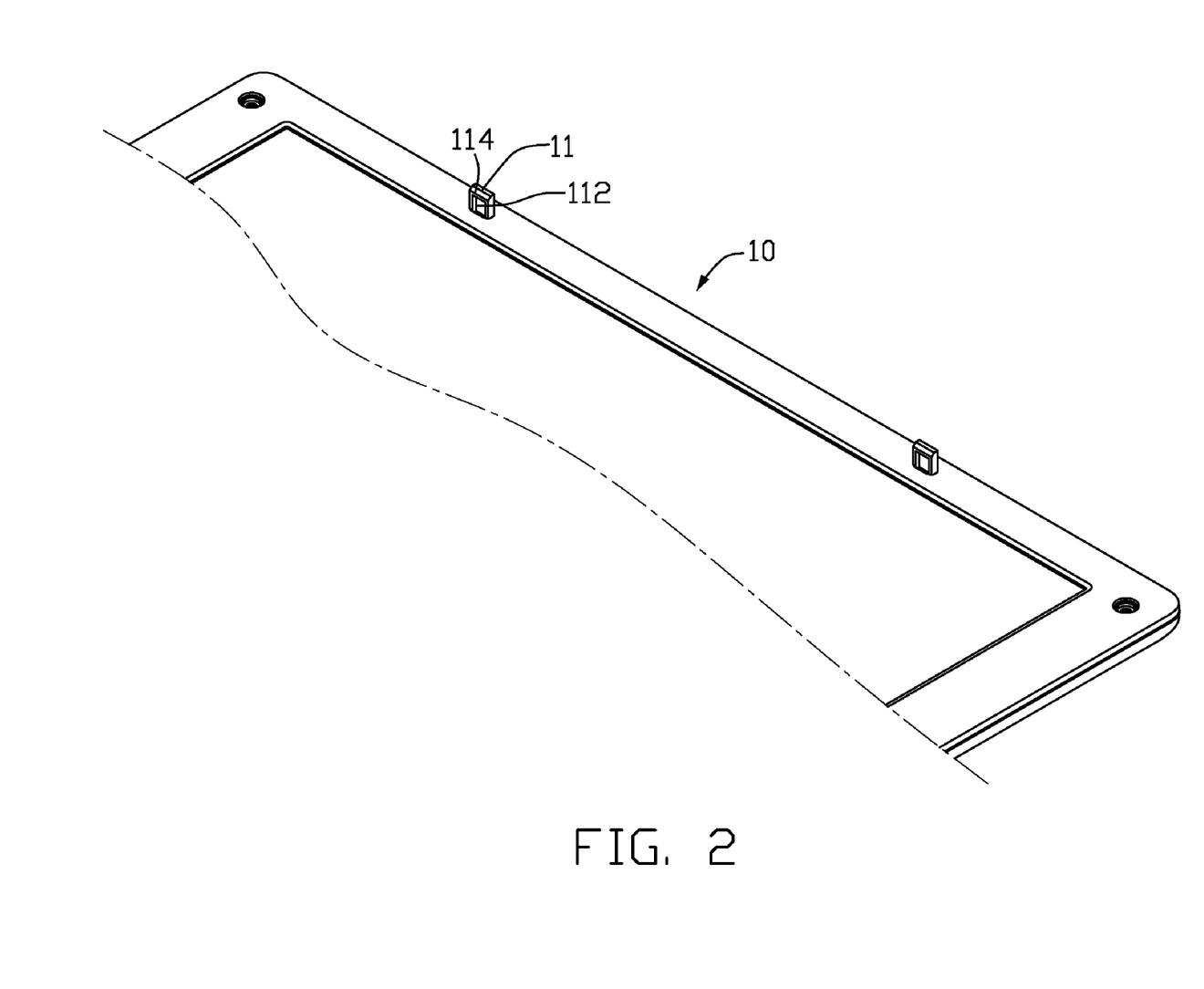
FIG. 2 is an enlarged, partial view of the cover in FIG. 2, but viewed from another aspect.

The cover 10 has a pair of latching hooks 11 extending down from a vicinity of a front edge thereof toward the base 20. Referring to FIG. 2, the latching hooks 11 are symmetrically distributed, and each of the latching hooks 11 defines a clasping recess 112 at a back portion, which is claspable by the latch mechanism 80 therein. A first bevel 114 is formed at a distal end of each of the latching hooks 11.

Referring back to FIG. 1, the base 20 is divided into an upper casing 21 and a lower casing 23, which are coupleable to seal internal components of the electronic device 900 therein. The upper casing 21 defines a pair of grooves 212 in a vicinity of a front wall 213 of the base 20, corresponding to the latching hooks 11 of the cover 10, so as to allow the latching hooks 11 extending therethrough to be clasped by the latch mechanism 80. A round first guiding hole 214 is defined in the front wall 213 of the upper casing 21 to guide the latch mechanism 80 move along a direction perpendicular to the front wall 213 of the upper casing 21 (hereinafter called a first direction).

Figure 3:
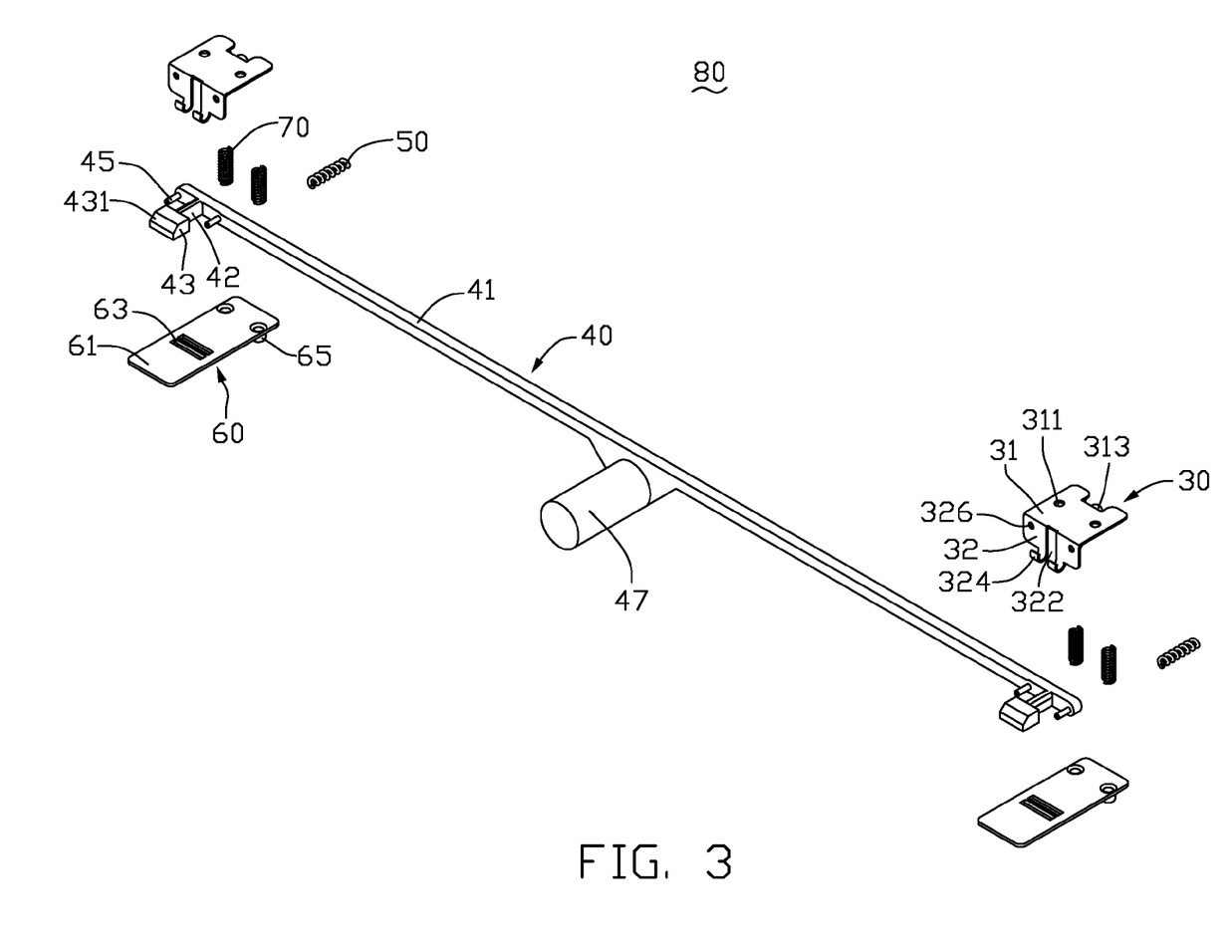
FIG. 3 is an enlarged view of the latch mechanism in FIG. 1, the latch mechanism including a pair of fulcrum plates, a latch lever, a pair of first elastic members, a pair of lifting plates, and a plurality of second elastic members.

Now referring to FIG. 3, an enlarged view of the latch mechanism 80 is illustrated. The latch mechanism 80 includes a pair of fulcrum plates 30, a latch lever 40, a pair of first elastic members 50, a pair of lifting plates 60, and a plurality of second elastic members 70. The fulcrum plates 30, the first elastic members 50, the lifting plates 60, and the second elastic members 70 are symmetrically distributed at two distal ends of the latch lever 40.

Figure 4:
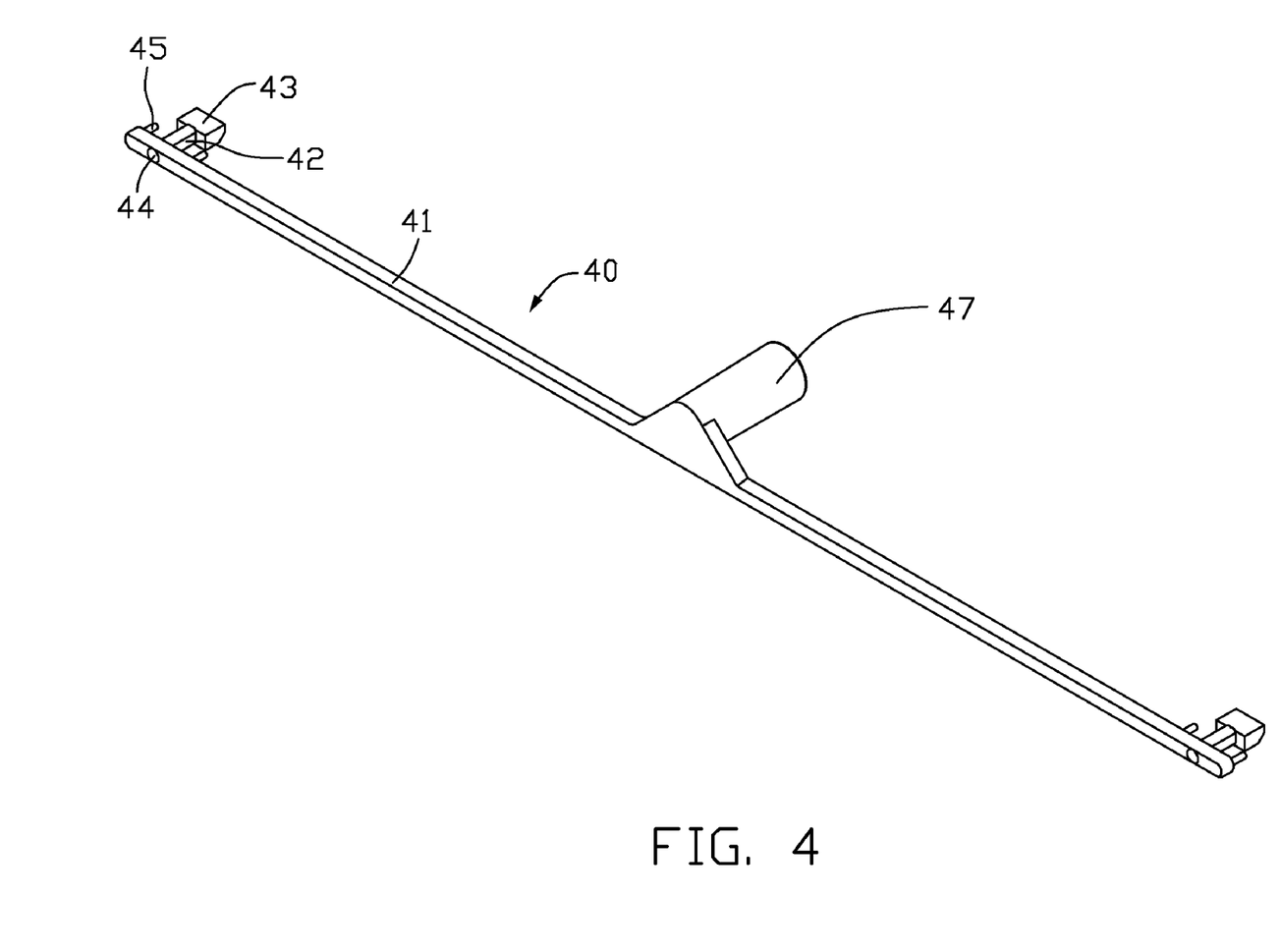
FIG. 4 is an isometric view of the latch lever in FIG. 2, but viewed from another aspect.

Referring to FIG. 3 and FIG. 4, the latch lever 40 includes a lever portion 41, a pair of connecting portions 42, a pair of latch portions 43, a pair of first receiving portions 44, four guiding pins 45, and a pressing portion 47. The lever portion 41 is long and slender, and extends along a direction perpendicular to the first direction (hereinafter called a second direction). The pressing portion 47 is cylindrically shaped, and is formed at a center of the lever portion 41 to extend through the first guiding hole 214 in the upper casing 21 for an external force to be applied thereto. One connecting portion 42, one latch portion 43, one first receiving portion 44, and a pair of guiding pins 45 are formed at one distal end of the lever portion 41 and extend along the first direction, and the other connecting portion 42, the other latch portion 43, one first receiving portion 44, and the other guiding pins 45 are formed at the other distal end of the lever portion 41 and extend along the first direction. The connecting portions 42 are slightly longer than the guiding pins 45, and connect the latch portions 43 with the lever portion 41. Each of the first receiving portions 44 is configured to receive one end of the corresponding first elastic member 50. The latch portions 43 correspond to the latching hooks 11 of the cover 10 for locking or releasing the latching hooks 11. A second bevel 431 is formed at a distal end of each of the latch portions 43. The guiding pins 45 are formed beside the latch portions 43 for guiding a movement of the latch portion 43 along the first direction.

Figure 5:
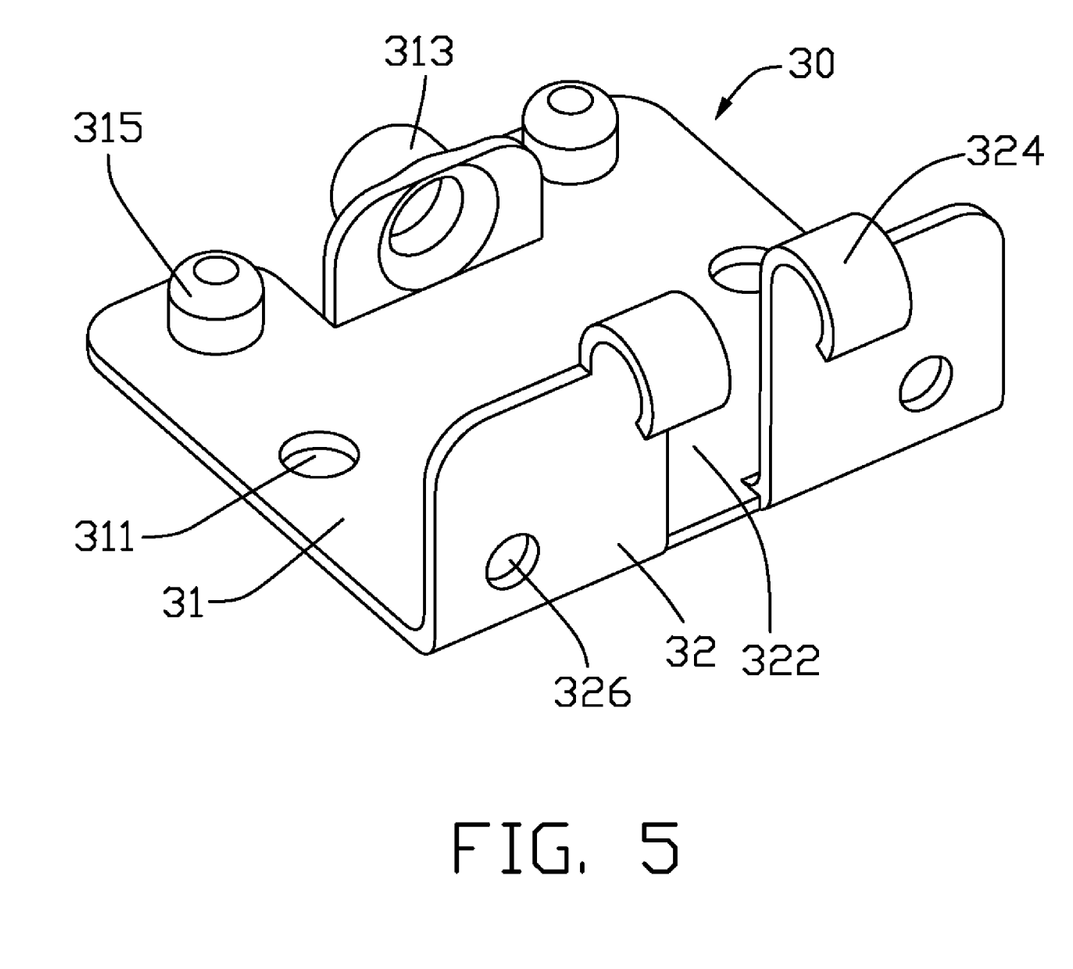
FIG. 5 is an enlarged, isometric view of the fulcrum in FIG. 2, but viewed from another aspect.

Referring to FIG. 3 and FIG. 5, each of the fulcrum plates 30 includes a supporting portion 31 and an engaging portion 32, which are perpendicular to each other. Each of the supporting portions 31 is formed parallel to the first direction, and forms a second receiving portion 313 along the first direction configured to receive the other end of the corresponding first elastic member 50. A pair of screw holes 311 is defined in each of the supporting portion 31 to allow a pair of screws (not shown) to extend therethrough to secure the corresponding fulcrum plate 30 to the upper casing 21 of the base 20. A pair of mounting pins 315 is formed along a direction perpendicular to the first direction and the second direction (hereinafter called a third direction) for mounting ends of the second elastic members 70. Each of the engaging portions 32 defines a pair of second guiding holes 326 to allow the guiding pins 45 to extend therealong thus guiding the movement of the latch portion 43. A notch 322 is defined between the second guiding holes 326 to receive the corresponding connecting portion 42 therein. A pair of arcuate engaging catches 324 is bent from at an edge of the engaging portion 32 to engage with the corresponding lifting plate 60.

The lifting plates 60 are parallel to the first direction, and each defines a pair of parallel slots 63 along the second direction at a vicinity of a center portion to allow the engaging catches 324 to extend therethrough and engage with a portion of the lifting plate 60 between the slots 63. A connecting bar is formed between the slots 63 on each lifting plate 60. Each of the lifting plates 60 forms a pair of third receiving portions 65 near a back end portion thereof to receive other ends of the second elastic members 70 therein.

Figure 6:
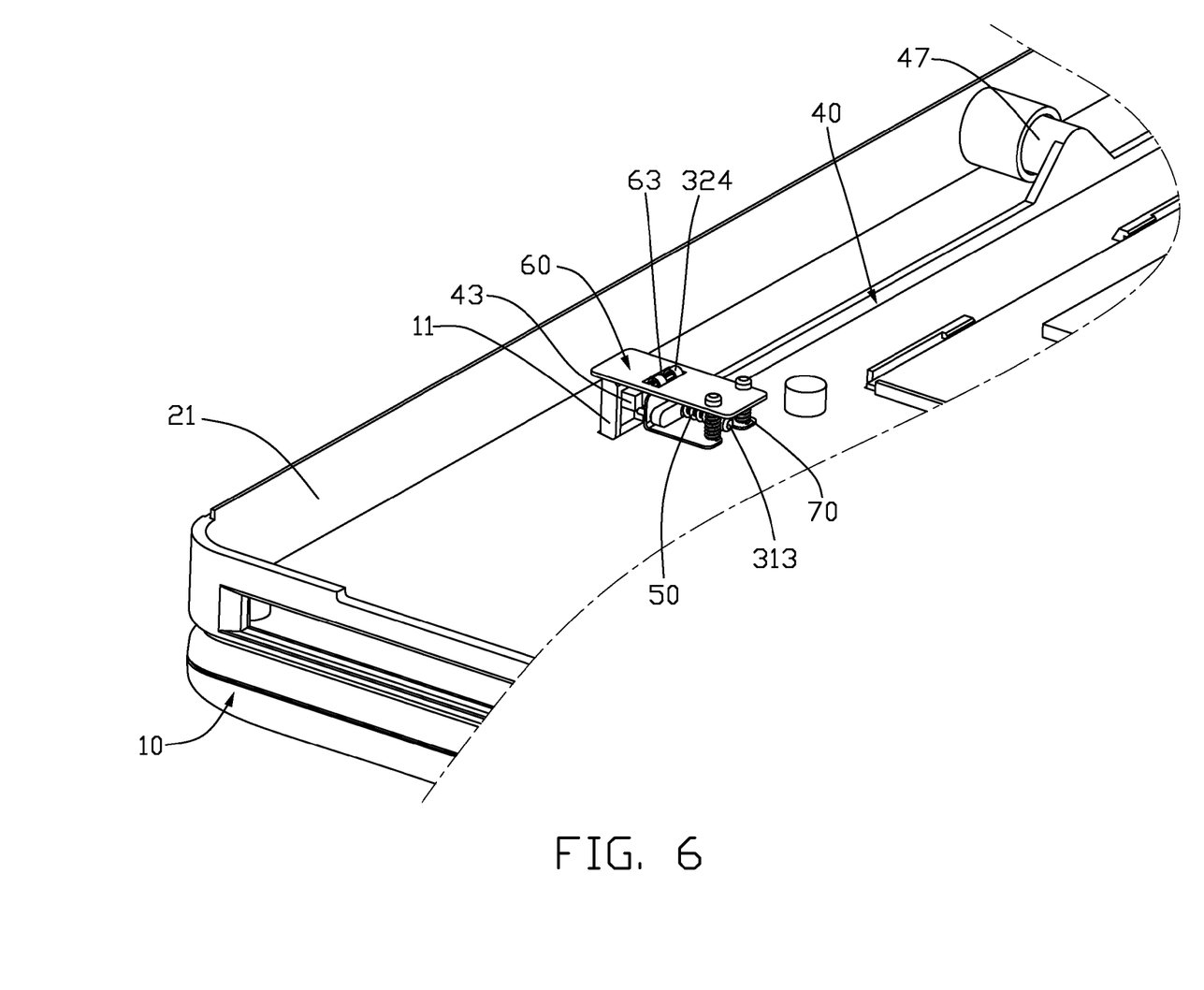
FIG. 6 is an assembled view of the electronic device in FIG. 1, with a lower casing of the base removed.

Referring to FIG. 6, an assembly process of the latch mechanism 80 will be described in detail. Firstly, the fulcrum plates 30 are secured to a bottom side of the upper casing 21 of the base 20 by a plurality of screws. Secondly, the connecting portions 42 of the latch lever 40 are positioned in the notches 322 in the engaging plates 32 of the fulcrum plates 30, along the third direction. Subsequently, the latch lever 40 is pushed along the first direction to cause the pressing portion 47 to insert into the first guiding hole 214 and the guiding pins 45 to insert into the second guiding holes 326. Fourthly, the first elastic members 50 are compressedly placed between the second receiving portions 313 of the fulcrum plates 30 and the first receiving portions 44 of the latch lever 40, then are released to be positioned along the first direction between the second receiving portions 313 and the first receiving portions 44. After that, the lifting plates 60 are rotatably engaged to the fulcrum plates 30, with the engaging catches 324 received in the slots 63. Finally, the second elastic members 70 are compressedly placed between the third receiving portion 65 and the mounting pins 315 for securing the lifting plates 60 to the upper casing 21, then are released to be positioned along the third direction between the third receiving portions 65 and the mounting pins 315.

After assembly, the latch lever 40 is secured to the base 20, and is moveable along the first direction. The first elastic members 50 provide first restoration forces along the first direction to the latch lever 40, and the second elastic members 70 provide second restoration forces along the third direction to the lifting plates 60.

Figure 7:
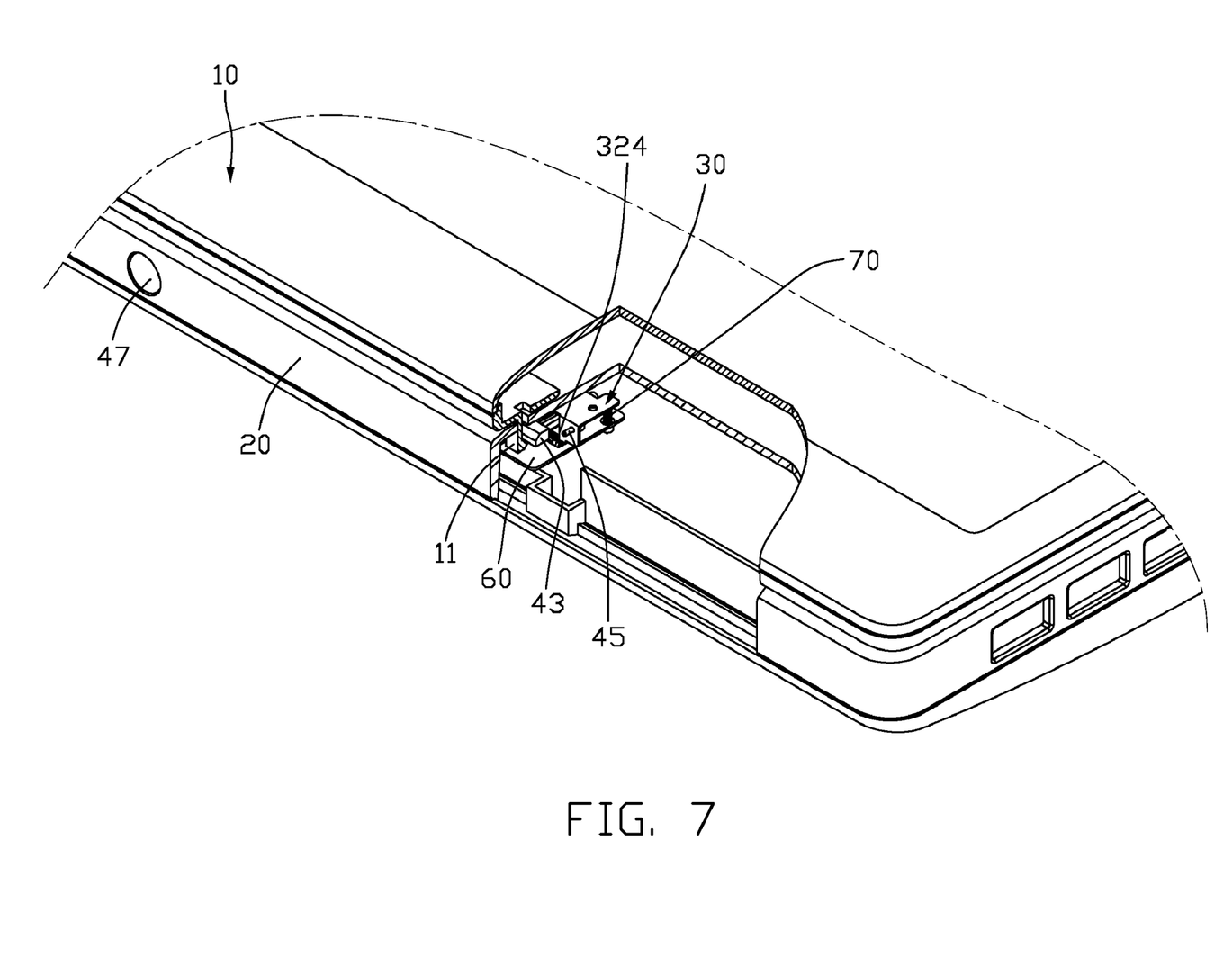
FIG. 7 is an assembled view of the electronic device in FIG. 1, with a part of the cover and the base cut off.

Referring to FIG. 7, the electronic device 900 is shown, when the cover 10 is locked to the base 20 by the latch mechanism 80. In the locked state, the latch portions 43 of the latch lever 40 are received in the clasping recesses 112 in the latching hooks 11. Under the first restoration forces applied by the first elastic members 50, the latch lever 40 remains engaged with the latching hooks 11, unless an external force, which is greater than a sum of the first restoration forces, is applied to the pressing portion 47 of the latch lever 40 along the first direction.

Figure 8:
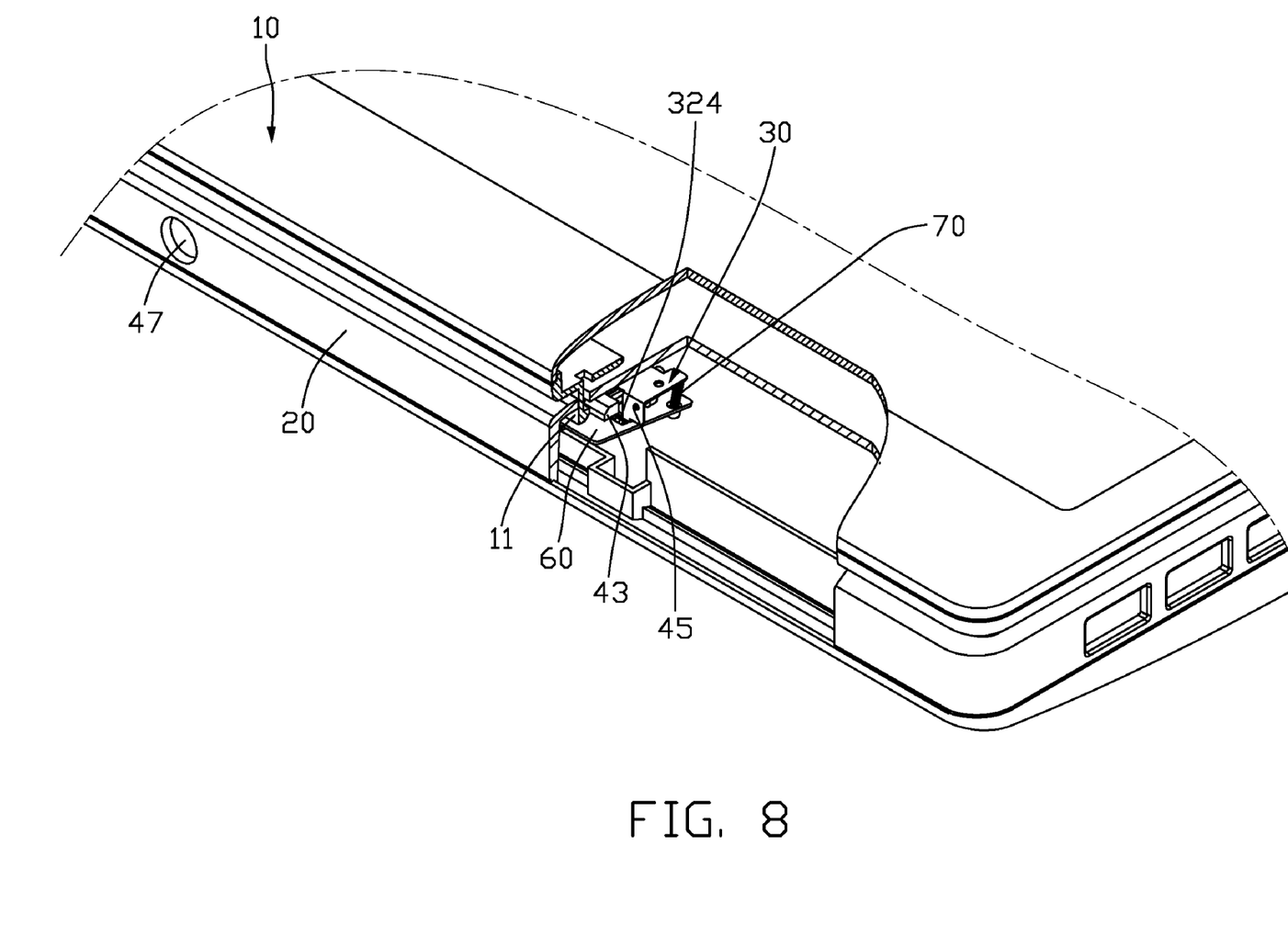
FIG. 8 is similar to FIG. 7, but showing the latch mechanism being released.

Referring to FIG. 8, when the pressing portion 47 of the latch lever 40 is pressed by an external force, the latch lever 40 moves backward along the first direction and the latch portions 43 gradually disengage from the latching hooks 11 of the cover 10. After the latch portions 43 totally leave the latching hooks 11, the cover 10 is released and the lifting plates 60 are applied by the second forces of the second elastic members 70 at the back ends. The lifting plates 60 deflect around joints of the fulcrum plates 30 and the lifting plates 60. A moment generated by the second restoration forces to the lifting plates 60 is greater than a moment generated by the force of gravity on the cover 10 to the front ends of the lifting plates 60. Under the second restoration forces of the second elastic members 70, the back ends of the lifting plates 60 descend and the front ends ascend in a seesaw action. As the front ends of the lifting plates 60 ascend, the latching hooks 11 of the cover 10 are lifted by the front ends of the lifting plates 60. In such an instance, even if the external force is removed, the latch lever 40 cannot be clasped by the latching hooks 11 of the cover 10. The cover 10 can then be rotated to any desired angle with respect to the base 20.

When the cover 10 is closed, the latching hooks 11 extend through the grooves 212 and reach the latch portions 43 of the latch lever 40. The first bevels 114 of the latching hooks 11 and the second bevels 431 of the latch portions 43 contact and interact to push the latch lever 40 along the first direction into the base 20. After that, the latch portions 43 enter the clasping recesses 112 under the first restoration forces of the first elastic members 50, and the latch portions 43 clasp the latching hooks 11 of the cover 10 to secure the cover 10 to the base 20.

As described above, the latch mechanism 80 firmly secures the cover 10 to the base 20 by use of the two latch portions 43. Once the pressing portion 47 of the latch lever 40 is pressed, the cover 10 is automatically lifted under the second restoration forces in aid of the lever mechanism configured by the fulcrum plates 30 and the lifting plates 60. Therefore, the latch mechanism 80 is easily operated with a single hand.

The foregoing description of the exemplary embodiments of the invention has been presented only for the purposes of illustration and description and is not intended to be exhaustive or to limit the invention to the precise forms disclosed. Many modifications and variations are possible in light of the above teaching. The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A latch mechanism for an electronic device including a cover and a base, the latch mechanism being secured to the base of the electronic device and comprising:
    a latch lever including a pressing portion for an external force being applied thereto along a first direction and at least one latch portion for clasping the cover, the at least one latch portion being moveable along the first direction together with the pressing portion;
    at least one fulcrum plate for being secured to the base corresponding to the at least one latch portion of the latch lever;
    at least one lifting plate deflectably secured to the at least one fulcrum plate;
    at least one first elastic member positioned between the latch lever and the at least one fulcrum plate to provide a first restoration force along the first direction to the latch lever; and
    at least one second elastic member positioned between the at least one fulcrum plate and the at least one lifting plate to provide a second restoration force to a side of the at least one lifting plate so as to make the other side of the at least one lifting plate resist against the cover.

2. The latch mechanism as claimed in claim 1, wherein the at least one fulcrum plate comprises a pair of engaging catches engaged with a portion of the at least one lifting plate in such a manner that the side and the other side of the at least one lifting plate are capable of deflecting about said portion in two opposing directions.

3. The latch mechanism as claimed in claim 2, wherein the at least one lifting plate defines two parallel slots therein to receive the engaging catches of the at least one fulcrum plate therethrough.

4. The latch mechanism as claimed in claim 1, wherein the latch lever forms at least one first receiving portion, the at least one fulcrum plate forms at least one second receiving portion, and one end of the at least one first elastic member is received in the first receiving portion, while the other end of the at least one first elastic member is received in the second receiving portion.

5. The latch mechanism as claimed in claim 1, wherein the at least one lifting plate forms at least one receiving portion receiving one end of the at least one second elastic member therein.

6. The latch mechanism as claimed in claim 1, wherein the latch lever forms at least one guiding pin along the first direction, and the at least one fulcrum plate defines at least one guiding hole receiving the at least one guiding pin therein.

7. An electronic device, comprising:
    a base, the base defining a first guiding hole in a front thereof and a pair of grooves at a top thereof;
    a cover pivotably attached to the top of the base, the cover extending a pair of latching hooks toward the base, the latching hooks being extendable through the grooves; and
    a latch mechanism secured to the base for clasping the cover to the base and releasing the cover from the base, the latch mechanism comprising:
        a latch lever including a pressing portion and a pair of latch portions, the pressing portion being received in the first guiding hole of the base for an external force being applied thereto to push the latch lever along a first direction, the latching portions being claspable by the latching hooks to clasp the cover to the bases;
        a pair of fulcrum plates secured to the base corresponding to the grooves in the base and the latch portions of the latch lever;
        a pair of lifting plates engaged with the fulcrum plates, the lifting plates being deflectable around a second direction perpendicular to the first direction;
        a pair of first elastic members positioned between the latch lever and the fulcrum plates to provide restoration forces along the first direction to the latch lever; and
        a pair of second elastic members positioned between the fulcrum plates and the lifting plates to provide second restoration forces along a third direction to the lifting plates to make the lifting plates resist against the latching hooks.

8. The electronic device as claimed in claim 7, wherein each of the latching hooks defines a clasping recess therein to receive the corresponding latch portion.

9. The electronic device as claimed in claim 7, wherein each of the latching hooks forms a first bevel, each of the latch portions forms a second bevel, and the first bevel and the second bevel are mateable to slide the latch lever along the first direction.

10. The electronic device as claimed in claim 7, wherein a moment generated by the second restoration forces to the lifting plates are greater than a moment generated by gravity acting on the cover to the lifting plates.

11. The electronic device as claimed in claim 7, wherein each of the fulcrum plates comprises a pair of engaging catches engaged with a portion of the corresponding lifting plate.

12. The electronic device as claimed in claim 11, wherein each of the lifting plates defines two parallel slots therein to slidably receive the engaging catches of the corresponding fulcrum plate therethrough.

13. The electronic device as claimed in claim 11, wherein the latch lever forms two first receiving portions, each of the fulcrum plates forms a second receiving portion, and one end of each of the first elastic members is received in the corresponding first receiving portion, while the other end of each of the first elastic members is received in the second receiving portion.

14. The electronic device as claimed in claim 11, wherein each of the lifting plates forms a receiving portion receiving one end of each of the second elastic members therein, the receiving portion being located at one side of said portion opposing the latching hooks.

15. The electronic device as claimed in claim 11, wherein the latch lever forms at least one guiding pin along the first direction, and each of the fulcrum plates defines at least one second guiding hole receiving the at least one guiding pin therein.

16. An electronic device comprising:
a base comprising an upper casing and a lower casing;
a cover pivotably mounted to the base, the cover having at least one latching hook; and
a latching mechanism mounted between the upper casing and the lower casing, comprising:
a latch lever comprising at least one latch portion engagable with the at least one latching hook and a pressing portion exposed to outside of the base for receiving an external force applied thereto to push the latch lever to slide in the base in a first direction;
at least one connecting member fixed with respect to the base and having a connecting portion;
at least one lifting member pivotably connected to the connecting portion;
at least one first elastic member one end of which is secured to the latch lever and the other end of which is secured with respect to the base to provide a first restoration force along the first direction to the latch lever to urge the at least one latch portion to engage with the at least one latching hook; and
at least one second elastic member one end of which is secured to the at least one lifting plate and the other end of which is secured with respect to the base to provide a second restoration force in a second direction perpendicular to the first direction to a side portion of the at least one lifting plate to cause the other side portion of the at least one lifting plate to resist against the cover, the side portion and the other side portion being located at two opposite sides of the connecting portion.

17. The electronic device as claimed in claim 16, wherein the at least one lifting plate defines a pair of spaced slots with a connecting bar located therebetween, and the connecting portion of the at least one connecting member comprises an arcuate catch movably catching the connecting bar.

18. The electronic device as claimed in claim 16, wherein the at least one connecting member defines at least one guiding hole, and the latch lever forms at least one guiding pin slidably extending through the at least one guiding hole along the first direction.

19. The electronic device as claimed in claim 16, wherein the upper casing defines at least one groove, and the at least one latching hook extends through the at least one groove to abut against the other side portion of the at least one lifting plate.

* * * * *